(12) United States Patent
Phillips et al.

(10) Patent No.: US 7,695,391 B2
(45) Date of Patent: *Apr. 13, 2010

(54) 8-SPEED TRANSMISSION

(75) Inventors: Andrew W. Phillips, Saline, MI (US);
Scott H. Wittkopp, Ypsilanti, MI (US);
James M. Hart, Belleville, MI (US);
Clinton E. Carey, Monroe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 306 days.

This patent is subject to a terminal disclaimer.

(21) Appl. No.: 11/859,103

(22) Filed: Sep. 21, 2007

(65) Prior Publication Data

US 2009/0082163 A1    Mar. 26, 2009

(51) Int. Cl.
*F16H 37/02* (2006.01)
*F16H 3/62* (2006.01)

(52) U.S. Cl. .................. 475/218; 475/219; 475/275

(58) Field of Classification Search ......... 475/275–291, 475/207, 218, 219, 329, 330, 903
See application file for complete search history.

(56) References Cited

U.S. PATENT DOCUMENTS

| | | | |
|---|---|---|---|
| 4,070,927 A | 1/1978 | Polak | |
| 4,709,594 A | 12/1987 | Maeda | |
| 5,106,352 A | 4/1992 | Lepelletier | |
| 5,385,064 A | 1/1995 | Reece | |
| 5,497,867 A | 3/1996 | Hirsch et al. | |
| 5,560,461 A | 10/1996 | Loeffler | |
| 5,599,251 A | 2/1997 | Beim et al. | |
| 5,641,045 A | 6/1997 | Ogawa et al. | |
| 5,651,435 A | 7/1997 | Perosky et al. | |
| 5,975,263 A | 11/1999 | Forsyth | |
| 6,053,839 A | 4/2000 | Baldwin et al. | |
| 6,071,208 A | 6/2000 | Koivunen | |
| 6,083,135 A | 7/2000 | Baldwin et al. | |
| 6,217,474 B1 | 4/2001 | Ross et al. | |
| 6,354,416 B1 | 3/2002 | Eo | |
| 6,375,592 B1 * | 4/2002 | Takahashi et al. | 475/262 |
| 6,422,969 B1 | 7/2002 | Raghavan et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,623,397 B1 | 9/2003 | Raghavan et al. | |

(Continued)

FOREIGN PATENT DOCUMENTS

JP      05172201  A  *  7/1993

(Continued)

*Primary Examiner*—Roger Pang
(74) *Attorney, Agent, or Firm*—Quinn Law Group, PLLC

(57) ABSTRACT

The transmission has a plurality of members that can be utilized in powertrains to provide eight forward speed ratios and one reverse speed ratio. The transmission includes three planetary gear sets, five torque-transmitting devices, one fixed interconnection, three external gear sets and a final drive gear set. The powertrain includes an engine and torque converter that is continuously connected to one of the planetary gear members and an output member that is continuously connected with one of the external gear sets. The five torque-transmitting devices provide interconnections between various planetary and external gear members, and the transmission housing, and are operated in combinations of three to establish eight forward speed ratios and one reverse speed ratio.

14 Claims, 2 Drawing Sheets

U.S. PATENT DOCUMENTS

| | | |
|---|---|---|
| 6,840,885 B2 | 1/2005 | Yi et al. |
| 2009/0082157 A1* | 3/2009 | Wittkopp et al. ............ 475/218 |
| 2009/0082158 A1* | 3/2009 | Wittkopp et al. ............ 475/218 |
| 2009/0082159 A1* | 3/2009 | Phillips et al. ............... 475/218 |
| 2009/0082160 A1* | 3/2009 | Phillips et al. ............... 475/218 |
| 2009/0082166 A1* | 3/2009 | Wittkopp et al. ............ 475/311 |
| 2009/0082167 A1* | 3/2009 | Wittkopp et al. ............ 475/311 |

FOREIGN PATENT DOCUMENTS

| | | |
|---|---|---|
| JP | 09-126283 | 5/1997 |
| JP | 09126283 A * | 5/1997 |

* cited by examiner

| GEAR STATE | Gear Ratio | Ratio Step | 80 Gnd S2 | 82 P2_4 R3 | 83 R1 PC2 | 84 P2_5 S3 | 85 P2_5 PC3 |
|---|---|---|---|---|---|---|---|
| Rev | -2.819 |  |  | x | x |  | x |
| N |  | -0.61 |  |  |  |  |  |
| 1st | 4.656 |  |  | x | x | x | x |
| 2nd | 3.024 | 1.54 | x | x |  | x |  |
| 3rd | 2.028 | 1.49 |  | x | x | x |  |
| 4th | 1.643 | 1.23 |  | x |  |  | x |
| 5th | 1.296 | 1.27 |  | x | x |  | x |
| 6th | 1.012 | 1.28 |  |  | x | x | x |
| 7th | 0.831 | 1.22 | x |  | x |  | x |
| 8th | 0.657 | 1.26 | x |  |  | x | x |

8-SPEED TRANSMISSION

TECHNICAL FIELD

The present invention relates to a power transmission in a front wheel drive configuration having three planetary gear sets, three external gear sets and a final drive gear set that are controlled by five torque-transmitting devices to provide eight forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions.

Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved transmission in a front wheel drive configuration having three planetary gear sets, three external gear sets and a final drive gear set controlled to provide eight forward speed ratios and one reverse speed ratio.

The transmission family of the present invention has three planetary gear sets positioned along first and second axes, wherein each planetary gear set includes a first, second and third member, which members may comprise a sun gear, a ring gear, or a planet carrier assembly member, in any order.

In referring to the first, second and third gear sets in this description and in the claims, these sets may be counted "first" to "third" in any order in the drawing (i.e., left to right, right to left, etc.). Additionally, the first, second or third members of each gear set may be counted "first" to "third" in any order in the drawing (i.e., top to bottom, bottom to top, etc.) for each gear set.

Each carrier member can be either a single-pinion carrier member (simple) or a double-pinion carrier member (compound). Embodiments with long pinions are also possible.

An interconnecting member continuously connects the first member of the first planetary gear set with the third member of the second planetary gear set.

Three external gear sets are positioned for transferring torque between the first and second axes, and each including first and second intermeshed external gears. A final drive gear set is connected to an output member.

The input member is continuously connected with the third member of the first planetary gear set. The output member is continuously connected with the second external gear (driven gear) of the final drive gear set.

A first torque-transmitting device, such as a brake, selectively connects the first member of the second planetary gear set with a stationary member (transmission housing/casing).

A second torque-transmitting device, such as a clutch, selectively connects the second external gear of the first external gear set with the third member of the third planetary gear set.

A third torque-transmitting device, such as a clutch, selectively connects the third member of the first planetary gear set with the second member of the second planetary gear set.

A fourth torque-transmitting device, such as a clutch, selectively connects the second external gear of the second external gear set with the first member of the third planetary gear set.

A fifth torque-transmitting device, such as a clutch, selectively connects the second external gear of the second external gear set with the second member of the third planetary gear set.

The five torque-transmitting devices are selectively engageable in combinations of three to yield eight forward speed ratios and one reverse speed ratio.

A variety of speed ratios and ratio spreads can be realized by suitably selecting the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1b is a truth table and chart depicting some of the operating characteristics of the powertrain shown in FIG. 1a; and FIG. 1c is a schematic representation of the powertrain of FIG. 1a depicted in lever diagram form.

DESCRIPTION OF THE PREFERRED EMBODIMENT

Figure 1A:
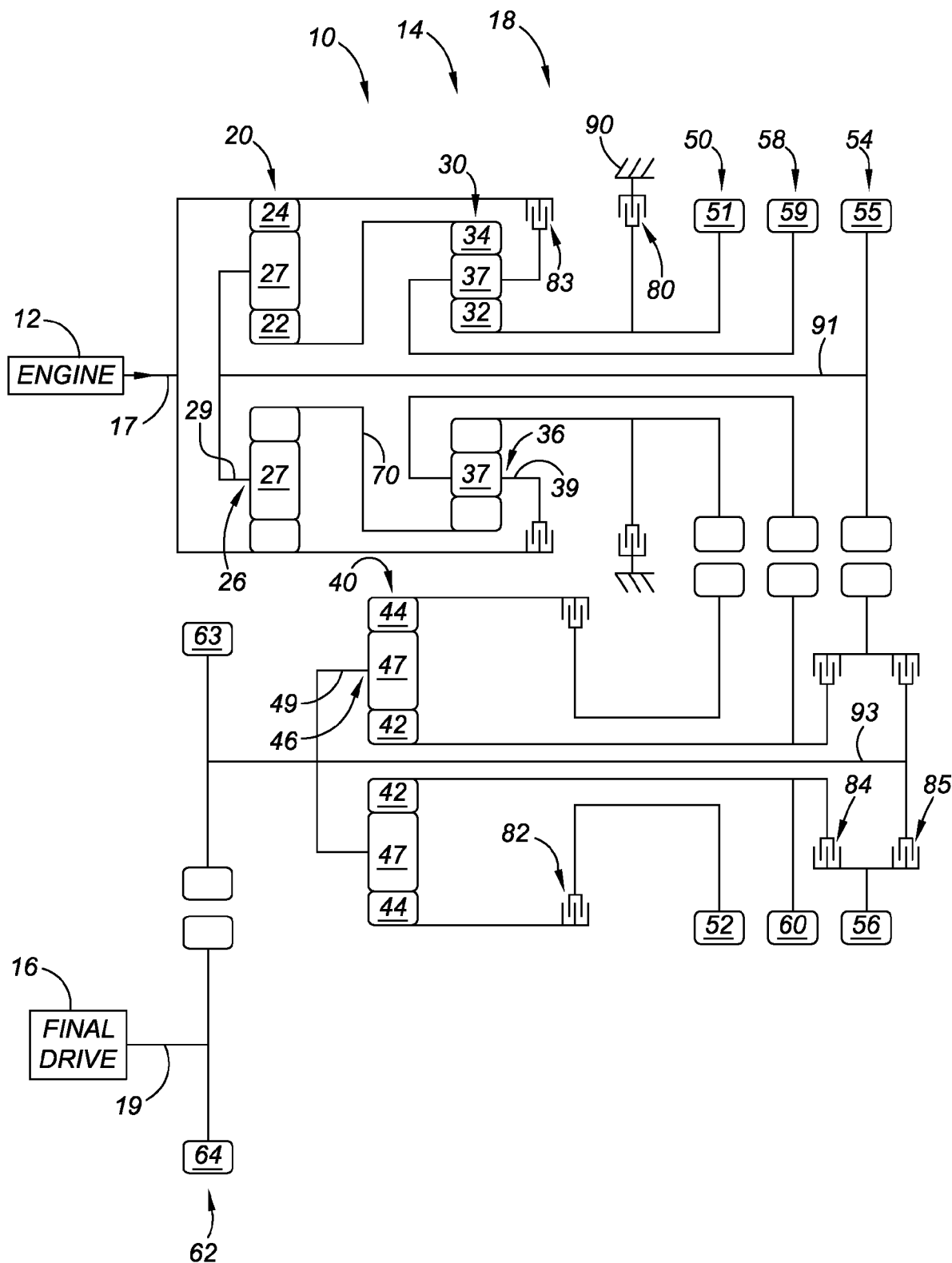
FIG. 1a is a schematic representation of a powertrain including a planetary transmission in accordance with the present invention.

Referring to the drawings, there is shown in FIG. 1a a powertrain 10 having a conventional engine and torque converter 12, a planetary transmission 14, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The front wheel drive planetary transmission 14 includes an input member 17 continuously connected with the engine 12, a planetary gear arrangement 18, and an output member 19 continuously connected with the final drive mechanism 16. The planetary gear arrangement 18 includes three planetary gear sets 20, 30, 40, three external gear sets, 50, 54, 58 and a final drive gear set 62. The three planetary gear sets 20, 30, 40 and three external gear sets 50, 54, 58 are positioned along first and second axes 91, 93, as shown in FIG. 1a.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the ring gear member 24 and the sun gear member 22.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 mounted on a carrier member 49. The pinion gears 47 are disposed in meshing relationship with both the ring gear member 44 and the sun gear member 42.

The first external gear set 50 includes first and second intermeshed external gears 51 and 52. The second external gear set 54 includes first and second intermeshed external gears 55 and 56. The third external gear set 58 includes first and second intermeshed external gears 59 and 60. The three external gear sets, 50, 54, 58 are positioned to transfer torque between the first and second axes 91, 93.

The final drive external gear set 62 includes the external drive gear 63 and the external driven gear 64.

The planetary gear arrangement also includes five torque-transmitting devices 80, 82, 83, 84 and 85. The torque-transmitting device 80 is a stationary-type torque-transmitting device, commonly termed brake or reaction clutch. The torque-transmitting devices 82, 83, 84 and 85 are rotating-type torque-transmitting devices, commonly termed clutches.

The input member 17 is continuously connected with the ring gear member 24 of the planetary gear set 20. The output member 19 is continuously connected with the driven external gear 64 of the final drive gear set 62.

An interconnecting member 70 continuously connects the sun gear member 22 of the planetary gear set 20 with the ring gear member 34 of the planetary gear set 30.

The planet carrier assembly member 26 of the planetary gear set 20 is continuously connected with the first external gear 55 of the second external gear set 54. The sun gear member 32 of the planetary gear set 30 is continuously connected with the first external gear 51 of the first external gear set 50. The sun gear member 42 of the planetary gear set 40 is continuously connected with the second external gear 60 of the third external gear set 58. The planet carrier assembly member 36 of the planetary gear set 30 is continuously connected with the first external gear 59 of the third external gear set 58. The planet carrier assembly member 46 of the planetary gear set 40 is continuously connected with the external drive gear 63 of the final drive external gear set 62.

A first torque-transmitting device, such as brake 80, selectively connects the sun gear member 32 of the planetary gear set 30 with the transmission housing 90. A second torque-transmitting device, such as clutch 82, selectively connects the second external gear 52 of the first external gear set 50 with the ring gear member 44 of the planetary gear set 40. A third torque-transmitting device, such as clutch 83, selectively connects the ring gear member 24 of the planetary gear set 20 with the planet carrier assembly member 36 of the planetary gear set 30. A fourth torque-transmitting device, such as clutch 84, selectively connects the second external gear 56 of the second external gear set 54 with the sun gear member 42 of the planetary gear set 40. A fifth torque-transmitting device, such as clutch 85, selectively connects the second external gear 56 of the second external gear set 54 with the planet carrier assembly member 46 of the planetary gear set 40.

Figures 1B, 1C:
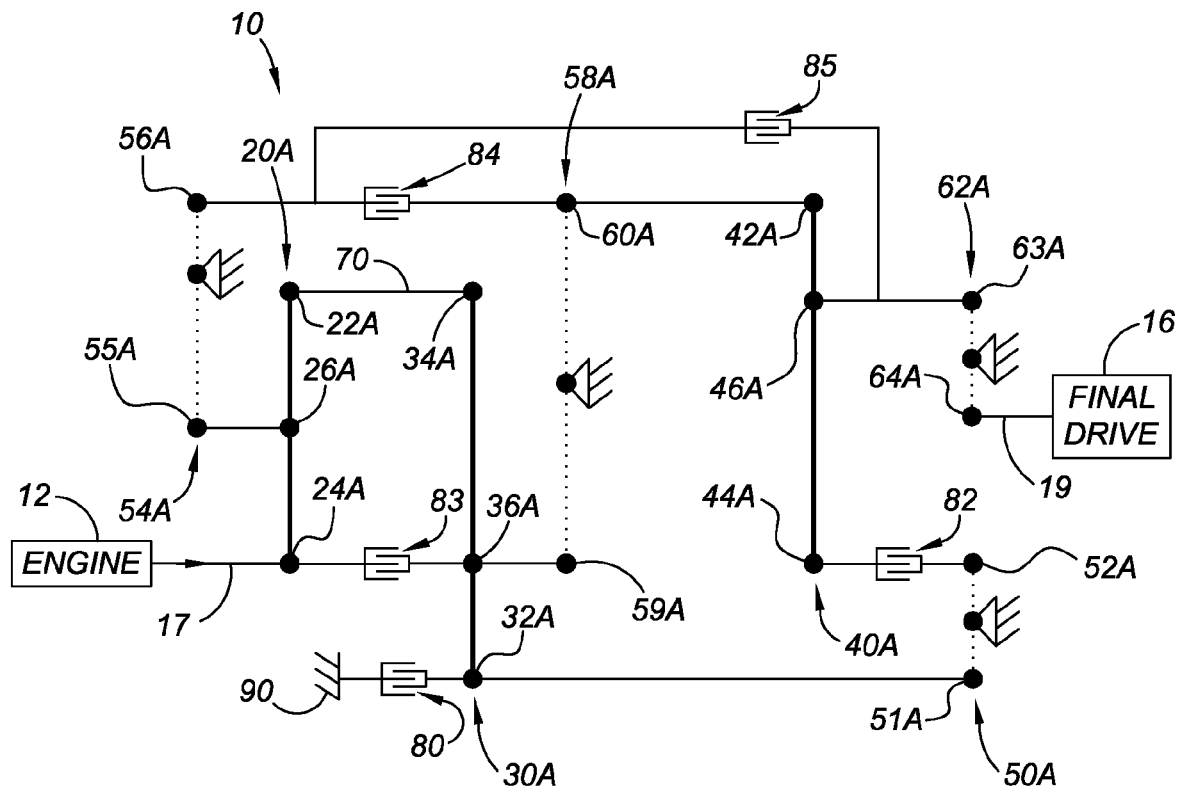

As shown in FIG. 1b, and in particular the truth table disclosed therein, the torque-transmitting devices are selectively engaged in combinations of three to provide eight forward speed ratios and one reverse speed ratio, all with single transition sequential shifts and a double overdrive ratio.

As set forth above, the engagement schedule for the torque-transmitting devices is shown in the truth table of FIG. 1b. The chart of FIG. 1b describes the ratio steps that are attained in the above described transmission. For example, the step ratio between the first and second forward speed ratios is 1.54, while the step ratio between the reverse speed ratio and first forward ratio is −0.61.

Referring to FIG. 1c, the embodiment of powertrain 10 depicted in FIG. 1a is illustrated in a lever diagram format. A lever diagram is a schematic representation of the components of a mechanical device such as an automatic transmission. Each individual lever represents a planetary gearset, wherein the three basic mechanical components of the planetary gear are each represented by a node. Therefore, a single lever contains three nodes: one for the sun gear member, one for the planet gear carrier member, and one for the ring gear member. The relative length between the nodes of each lever can be used to represent the ring-to-sun ratio of each respective gearset. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Vertical dashed lines with a grounded pivot point represent external gear sets. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

The powertrain 10 includes an input member 17 continuously connected with the engine 12, an output member 19 continuously connected with the final drive mechanism 16, a first planetary gear set 20A having three nodes: a first node 22A, a second node 26A and a third node 24A; a second planetary gear set 30A having three nodes: a first node 32A, a second node 36A and a third node 34A; and a third planetary gear set 40A having three nodes: a first node 42A, a second node 46A and a third node 44A. The powertrain 10 also includes a first external gear set 50A having two external gears: a first external gear 51A and a second external gear 52A; a second external gear set 54A having two external gears: a first external gear 55A and a second external gear 56A; a third external gear set 58A having two external gears: a first external gear 59A and a second external gear 60A; and a final drive gear set 62A with two external gears: a external drive gear 63A and a external driven gear 64A.

The input member 17 is continuously connected with the node 24A. The output member 19 is continuously connected with the external gear 64A.

The node 22A is continuously connected with the node 34A via interconnecting member 70.

A first torque-transmitting device, such as brake 80, selectively connects the node 32A with the transmission housing 90. A second torque-transmitting device, such as clutch 82, selectively connects the node 44A with the external gear 52A. A third torque-transmitting device, such as clutch 83, selectively connects the node 24A with the node 36A. A fourth torque-transmitting device, such as clutch 84, selectively connects the external gear 56A with the node 42A. A fifth torque-transmitting device, such as clutch 85, selectively connects the external gear 56A with the node 46A.

To establish ratios, three torque-transmitting devices are engaged for each gear state. The engaged torque-transmitting devices are represented by an "X" in each respective row of FIG. 1b. For example, to establish reverse gear, the brake 80 and clutches 82, 85 are engaged. The brake 80 engages the node 32A with the transmission housing 90. The clutch 82 engages the external gear 52A with the node 44A. The clutch 85 engages the external gear 56A with the node 46A. Likewise, the eight forward ratios are achieved through different combinations of clutch engagement as per FIG. 1b.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input member;
an output member;
first, second and third planetary gear sets each having first, second and third members, said gear sets being positioned along first and second axes;
an interconnecting member continuously connecting said first member of said first planetary gear set with said third member of said second planetary gear set;
three external gears sets positioned for transferring torque between said first and second axes, said three external gear sets each including first and second intermeshed external gears; and
five torque-transmitting devices for selectively interconnecting said members of said planetary gear sets or said first and second external gears of said three gear sets with each other, with a stationary member, or with other members of said planetary gear sets, said five torque-transmitting devices being engaged in combinations of three to establish at least eight forward speed ratios and at least one reverse speed ratio between said input member and said output member.

2. The transmission of claim 1, wherein a first of said five torque-transmitting devices is operable for selectively connecting said first member of said second planetary gear set with said stationary member.

3. The transmission of claim 2, wherein a second of said five torque-transmitting devices is operable for selectively connecting said second external gear of said first external gear set with said third member of said third planetary gear set.

4. The transmission of claim 3, wherein a third of said five torque-transmitting devices is operable for selectively connecting said third member of said first planetary gear set with said second member of said second planetary gear set.

5. The transmission of claim 4, wherein a fourth of said five torque-transmitting devices is operable for selectively connecting said second external gear of said second external gear set with said first member of said third planetary gear set.

6. The transmission of claim 5, wherein a fifth of said five torque-transmitting devices is operable for selectively connecting said second external gear of said second external gear set with said second member of said third planetary gear set.

7. The transmission defined in claim 1, wherein said second member of said first planetary gear set is continuously connected with said first external gear of said second external gear set; said first member of said second planetary gear set is continuously connected with said first external gear of said first external gear set; said first member of said third planetary gear set is continuously connected with said second external gear of said third external gear set; said second member of said second planetary gear set is continuously connected with said first external gear of said third external gear set; said second member of said third planetary gear set is continuously connected with an external drive gear of a final drive external gear set.

8. The transmission of claim 1, wherein said first, second and third members of said first, second and third planetary gear sets comprise a sun gear member, a planet carrier assembly member and a ring gear member, respectively.

9. The transmission of claim 1, wherein said input member is continuously connected with said third member of said first planetary gear set, and said output member is continuously connected with a second external gear of a final drive external gear set.

10. A multi-speed transmission comprising:
an input member;
an output member;
first, second and third planetary gear sets each having first, second and third members, said gear sets being positioned along first and second axes;
an interconnecting member continuously connecting said first member of said first planetary gear set with said third member of said second planetary gear set;
three external gears sets positioned for transferring torque between said first and second axes, said three external gear sets each including first and second intermeshed external gears;
a first torque-transmitting device selectively connecting said first member of said second planetary gear set with a stationary member;

a second torque-transmitting device selectively connecting said second external gear of said first external gear set with said third member of said third planetary gear set;

a third torque-transmitting device selectively connecting third member of said first planetary gear set with said second member of said second planetary gear set;

a fourth torque-transmitting device selectively connecting said second external gear of said second external gear set with said first member of said third planetary gear set;

a fifth torque-transmitting device selectively connecting said second external gear of said second external gear set with said second member of said third planetary gear set; and said five torque-transmitting devices being engaged in combinations of three to establish at least eight forward speed ratios and at least one reverse speed ratio between said input member and said output member.

11. The transmission of claim 10, wherein said first, second and third members of said first, second and third planetary gear sets comprise a sun gear member, a planet carrier assembly member and a ring gear member, respectively.

12. The transmission of claim 10, wherein said second member of said first planetary gear set is continuously connected with said first external gear of said second external gear set; said first member of said second planetary gear set is continuously connected with said first external gear of said first external gear set; said first member of said third planetary gear set is continuously connected with said second external gear of said third external gear set; said second member of said second planetary gear set is continuously connected with said first external gear of said third external gear set; and said second member of said third planetary gear set is continuously connected with a drive gear of a final drive external gear set.

13. The transmission of claim 10, wherein said input member is continuously connected with said third member of said first planetary gear set, and said output member is continuously connected with a second external gear of a final drive external gear set.

14. A multi-speed transmission comprising:

an input member;

an output member;

first, second and third planetary gear sets each having a sun gear member, a planet carrier assembly member and a ring gear member, said gear sets being positioned along first and second axes;

an interconnecting member continuously connecting said sun gear member of said first planetary gear set with said ring gear member of said second planetary gear set;

three external gears sets positioned for transferring torque between said first and second axes, said three external gear sets each including first and second intermeshed external gears;

a first torque-transmitting device selectively connecting said sun gear member of said second planetary gear set with a stationary member;

a second torque-transmitting device selectively connecting said second external gear of said first external gear set with said ring gear member of said third planetary gear set;

a third torque-transmitting device selectively connecting ring gear member of said first planetary gear set with said planet carrier assembly member of said second planetary gear set;

a fourth torque-transmitting device selectively connecting said second external gear of said second external gear set with said sun gear member of said third planetary gear set;

a fifth torque-transmitting device selectively connecting said second external gear of said second external gear set with said planet carrier assembly member of said third planetary gear set; and said five torque-transmitting devices being engaged in combinations of three to establish at least eight forward speed ratios and at least one reverse speed ratio between said input member and said output member.

* * * * *